United States Patent [19]
Harrow

[11] Patent Number: 5,161,268
[45] Date of Patent: Nov. 10, 1992

[54] INTERLOCKING JOINT ASSEMBLY FOR JOINING BED FRAMES

[75] Inventor: Lawrence M. Harrow, Los Angeles, Calif.

[73] Assignee: Hollywood Bed & Spring Mfg. Co., Los Angeles, Calif.

[21] Appl. No.: 706,933

[22] Filed: May 29, 1991

[51] Int. Cl.⁵ .................................. A47C 19/04
[52] U.S. Cl. ................................ 5/201; 5/282.1; 5/184; 403/254; 403/393
[58] Field of Search ............... 5/201, 202, 176.1, 181, 5/184, 185, 282.1; 403/254, 255, 316, 393

[56] References Cited

U.S. PATENT DOCUMENTS

| | | | |
|---|---|---|---|
| 2,544,274 | 3/1951 | Moeller | 5/185 |
| 2,639,042 | 5/1953 | Lambert et al. | 403/353 |
| 3,713,181 | 1/1973 | Hougland | 5/176.1 |
| 3,730,108 | 5/1973 | Stroh | 108/108 |
| 3,744,068 | 7/1973 | Harris | 5/184 |
| 3,757,361 | 9/1973 | Harris et al. | 5/184 |
| 3,849,012 | 11/1974 | Krouse | 403/188 |
| 4,106,141 | 8/1978 | Hooker | 5/201 |
| 4,225,265 | 9/1980 | Hooker et al. | 5/201 |
| 4,444,323 | 4/1984 | Travis | 211/193 |

Primary Examiner—Alexander Grosz
Attorney, Agent, or Firm—Spensley Horn Jubas & Lubitz

[57] ABSTRACT

An interlocking joint assembly for joining a first frame member and a second frame member of a bed frame and for adjusting the width of the bed frame. The assembly includes at least one projection on the first frame member and at least one keyhole slot defined by the second frame member and adapted to receive the projection. The assembly includes a locking member provided on the second frame member which is pivotable between a locking position and a release position. The locking member has a horizontally extending ear which, in the locking position, overlies a horizontal flange of the second frame member and is engaged by a box spring placed on the assembled bed frame.

13 Claims, 1 Drawing Sheet

U.S. Patent    Nov. 10, 1992    5,161,268
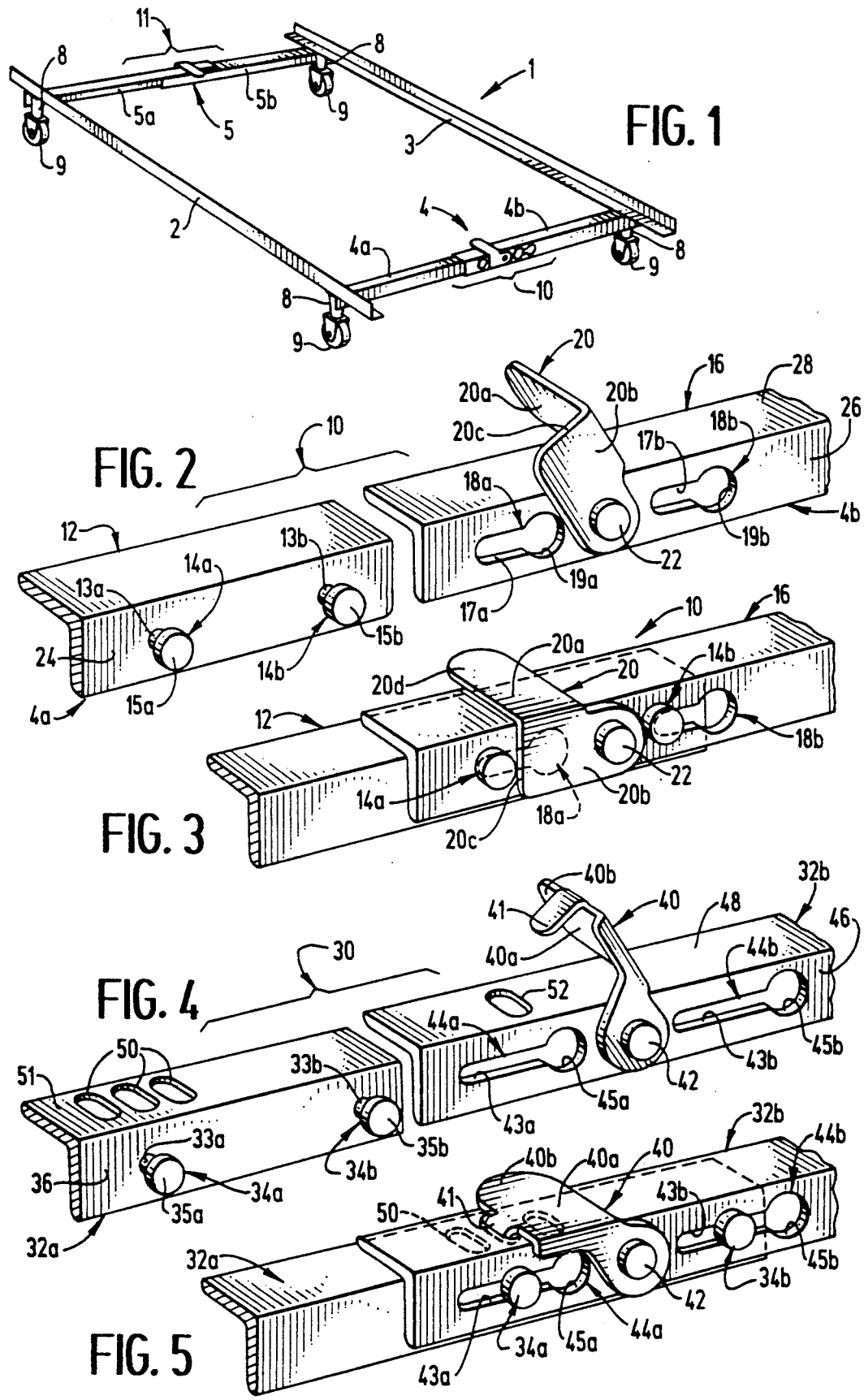

INTERLOCKING JOINT ASSEMBLY FOR JOINING BED FRAMES

FIELD OF THE INVENTION

The present invention relates to bed frames of the right angle rail type, and more particularly to interlocking joint assemblies for joining bed frames.

DESCRIPTION OF RELATED ART

Hollywood style beds are generally constructed with opposed right angle side frame members disposed in parallel to one another and opposed right angle head and foot frame members disposed in parallel to one another. These right angle frame members may be constructed so as to enable the bed frame members to be knocked down or folded for storage or shipment. The head and foot frame members may each comprise a pair of half section members which are connected by adjustable connectors which allow the width of the bed frame to be adjusted to accommodate different sizes of beds, such as for example, the standard twin size bed, the queen size bed, and the king size bed. One such connector is a clamp which includes a threaded bolt. While clamps of this nature can firmly connect the half section pairs, tools may be required to tighten or loosen the clamps. Furthermore, the clamps may loosen after use which may allow the bed frame to inadvertently disassemble.

Other connectors are known in the prior art. For example, U.S. Pat. Nos. 4,225,265 and 4,106,141 describe rivet and slot type interlocking which allow ready assembly and disassembly of frame members of a metal bed frame without the need for tools. However, the connector joints of U.S. Pat. No. 4,225,265 do not readily allow adjustment of the bed width, while the connector joints of U.S. Pat. No. 4,106,141 are not particularly resistant to inadvertent disassembly.

SUMMARY OF THE INVENTION

It is an object of the present invention to provide an improved interlocking joint assembly in which the bed frame is easily assembled.

It is another object of the present invention to provide an improved interlocking joint assembly in which the width of a bed frame may be easily adjusted to accommodate beds of different sizes without the use of tools.

It is still another object of the present invention to provide an improved interlocking joint assembly which resists inadvertent disassembly of the bed frame These and other objects and advantages are achieved in an interlocking joint assembly for joining a first frame member and a second frame member of a bed frame which, in the illustrated embodiment includes, at least one projection on the first frame member and at least one keyhole slot in the second frame member which engages the projection. In a preferred embodiment, the assembly includes a locking member provided on the second frame member which is pivotable between a locking position and a release position. The locking member has an ear which, in the locking position, is engaged by a box spring placed on the assembled bed frame. Such an arrangement has been found to provide an interlocking joint assembly which ensures that the width of the bed frames is easily adjusted to accommodate different size beds and also resists inadvertent movement of the locking member to the release position.

BRIEF DESCRIPTION OF THE DRAWINGS

FIG. 1 is a perspective view of a bed frame having interlocking joint assemblies in accordance with one embodiment of the present invention;

FIG. 2 is a perspective view of the interlocking joint assembly of FIG. 1 shown in a release position;

FIG. 3 is a perspective view of the interlocking joint assembly of in FIG. 1 shown in a locking position;

FIG. 4 is a perspective view of an interlocking joint assembly in accordance with a second embodiment of the present invention and shown in a release position; and FIG. 5 is a perspective view of the interlocking joint assembly of FIG. 4 shown in a locking position.

DETAILED DESCRIPTION OF THE PREFERRED EMBODIMENTS

Referring to FIG. 1, a bed frame in accordance with a preferred embodiment of the present invention is indicated generally at 1. The bed frame 1 includes a pair of side frame members 2 and 3, respectively, and head and foot cross members 4 and 5, respectively. The head cross member 4 includes a pair of half section frame members 4a and 4b, and the foot cross member 5 includes a pair of half section frame members 5a and 5b. The half section cross frame members 4a, and 5a may be pivotally connected to the side frame member 2 so that they can be folded parallel to the side frame member 2 for storage and transportation. The half section cross frame members 4b and 5b and side frame member 3 have a similar interconnection.

The side frame members and half section cross frame members are formed from angled iron. The bed frame 1, in the illustrated embodiment, may have legs 8 which carry casters 9 at respective corners thereof to support the bed frame above the floor and to provide mobility for the bed frame when it is erected.

The half section cross frame members 4a and 4b are releasably connected by an interlocking joint assembly 10. The interlocking joint assembly 10 is shown in greater detail in FIGS. 2 and 3. It should be appreciated that an interlocking joint assembly 11 for the head cross frame members 5a and 5b is constructed in a similar manner but is a mirror image of the joint assembly 10.

The interlocking joint assembly 10 comprises one end 12 of the half section cross frame member 4a and one end 16 of the other half section cross 4b. An arm 20 is pivotally connected by a rivet 22 to the end 16 of the second frame member 4b. The arm 20 is pivotable between a disengaging position as shown in FIG. 2 and a locking position as shown in FIG. 3.

In the illustrated embodiment, two spaced projections 14a and 14b are fixed to a vertical leg 24 at the end 12 of the first angle frame member 4a. Two spaced keyhole slots 18a and 18b, which are adapted to mate with the projections 14a and 14b, are formed in a vertical leg 26 at the end 16 of the second frame member 4b. The projections 14a and 14b and keyhole slots 18a and 18b are both aligned substantially horizontally along the length of the first and second angle frame members 4a and 4b.

The projections 14a and 14b include stems 13a and 13b, and enlarged heads 15a and 15b respectively. In the illustrated embodiment, the stems and the heads are shown to be generally circular in cross section, but it is anticipated that a variety of other shapes may be chosen, such as for example, square, rectangular, etc. The keyhole slots 18a and 18b of the member 4b have enlarged generally circular openings 19a and 19b for passage of the projection heads 15a and 15b of the member 4a when the arm 20 is pivoted up into the disengaged position shown in FIG. 2. The enlarged openings 19a and 19b are connected to longitudinal slots 17a and 17b, respectively, which receive the stems 13a and 13b of the projections 14a and 14b. It should also be appreciated that the enlarged openings 19a and 19b also need not have a circular shape as illustrated but may have other shapes as well.

The stems 13a and 13b space the heads 15a and 15b from the vertical leg 24 of the frame member 4a by a distance slightly greater than the thickness of the vertical leg 26 of the second frame member 4b. As a consequence, the stems 13a and 13b of the projections 14a and 14b, respectively, may be inserted into the narrowed slots 17a and 17b of the keyhole slots 18a and 18b, respectively. In addition, when the projections 14a and 14b are inserted into the narrowed slots 17a and 17b of the keyhole slots 18a and 18b, the heads 15a and 15b, which are wider in diameter than the width of the narrowed longitudinal slots 17a and 17b, are positioned slightly above the vertical leg 26 of the second frame member 16. As a result, the heads 15a and 15b restrict transverse and torsional movement of the frame member 4a with respect to the frame member 4b.

To lock the frame members 4a and 4b in place, the arm 20 has a horizontally extending ear 20a and a substantially rectangular vertical plate 20b. The rectangular vertical plate 20b includes an edge 20c which abuts the projection 14a when the arm 20 is pivoted to the locking position illustrated in FIG. 3. In this position, longitudinal movement of the projections 14a and 14b along the keyhole slots 18a and 18b is prevented. The horizontally extending ear 20a extends over the width of the horizontal flange of the second frame member 16 so that an end portion 20d of the ear 20a protrudes from the second frame member 4b. The end portion 20d facilitates grasping the ear for manual operation of the arm 20.

When a box spring (not shown) is placed on the assembled bed frame 1, the box spring is placed directly on the horizontally extending ear 20a which lies flat on the horizontal leg 28 of the frame member 4b when the arm 20 is in the locking position. Consequently, the arm 20 is firmly pressed downwardly in the locking position during the use of the bed, and thus is prevented from accidentally moving out to the disengaging position.

To release the frame members 4a and 4b, the arm 20 is pivoted to the disengaging position illustrated in FIG. 2, which allows the projection heads to be returned to the enlarged openings 19a and 19b and to be withdrawn from the keyhole slots 18a and 18b, respectively. Should a larger width be desired, the projection 14b may be inserted into the keyhole slot 18a rather than the keyhole slot 18b. The arm 20 is then pivoted downward to engage the projection 14b in the locking position rather than the projection 14a depicted in FIG. 3. It should be appreciated that additional bed frame width adjustability may be readily obtained by providing additional projections and keyhole slots along the respective frame members.

An interlocking joint assembly 30 in accordance with a second embodiment of the present invention is shown in FIGS. 4 and 5. The interlocking joint assembly 30 comprises a first angle frame member 32a and a second angle frame member 32b. The second frame member 32b includes an arm 40 pivotally connected thereto by a rivet 42. The arm 40 is pivotable between a disengaging position as shown in FIG. 4 and a locking position as shown in FIG. 5.

In the illustrated embodiment, the first angle frame member 32a has two spaced projections 34a and 34b securely fixed to a vertical leg 36 thereof, which are similar to the projections of the first embodiment. Two spaced keyhole slots 44a and 44b, which are adapted to mate with the projections 34a and 34b, are also formed in a vertical leg 46 of the second frame member 32b in a similar manner as described in connection with the first embodiment. The projections 34a and 34b include stems 33a and 33b, and enlarged heads 35a and 35b respectively. The keyhole slots 44a and 44b comprise enlarged generally circular openings 45a and 45b for passage of the heads 35a and 35b and narrowed longitudinal slots 43a and 43b. The enlarged openings 45a and 45b are connected respectively to the longitudinal slots 43a and 43b for engagement with the stems 33a and 33b of the projections 34a and 34b. In the embodiment of FIGS. 4 and 5, the narrowed longitudinal slots 43a and 43b are longer than the corresponding slots 17a and 17b of the embodiment of FIGS. 2 and 3. The heads 35a and 35b are spaced from the vertical leg of the first frame member 32a by a distance slightly greater than the thickness of the vertical leg 46 of the second frame member 38. It should also be appreciated that the heads 35a and 35b restrict the transverse and torsional movement of the second frame member 38 with respect to the first frame member 32a in a manner similar to that of the embodiment of FIGS. 2 and 3 when the projections 34a and 34b are inserted into the narrowed slots 43a and 43b of the keyhole slots 44a and 44b.

The arm 40 comprises a horizontally extending ear 40a. The horizontally extending ear 40a extends over the width of the horizontal leg 48 of the second frame member 38 so that an end portion 40b of the ear 40a protrudes beyond the second frame member 32b. In addition, the arm 40 has a downwardly extending tab 41 at one edge of the ear 40a. In the illustrated embodiment, the tab 41 is angled at 90° with respect to the ear 40a. The tab 41 serves to fix the longitudinal position of the first frame member 32a relative to the second frame member 32b, in a manner which allows adjustment of the width of the bed frame 1 as described hereunder.

A horizontal leg 51 of the first frame member 32a includes three aperture 50 and the horizontal leg 48 of the second frame member 32b includes a single aperture 52. The aperture 52 is formed in a position wherein the tab 41 is received in the aperture 52 in the locking position.

To assemble the frames, the projections 34a and 34b are inserted into the keyhole slots 44a and 44b, and the width of the bed frame 1 is then adjusted by sliding the first frame member 32a in the longitudinal direction thereof with respect to the second frame member 32b. As the frame 32a slides relative to the frame 32b, the projection stems 33a and 33b slide in the narrowed slots 43a and 43b, respectively. Depending upon the desired width of the bed frame 1, the aperture 52 in the second frame member 32b is aligned with the appropriate aperture of the apertures 50 in the first frame member 32a. The arm 40 is then moved to the locking position so that the tab 41 engages the aperture 52 and the selected aperture 50 and locks the relative position of the first frame member 32a with respect to the second frame member 32b. Upon completion of the assembly of the bed frame 1 in the manner described above, a box spring (not shown) is placed thereon. As a result, the box spring is placed directly on the horizontally extending ear 40a which lies flat on the horizontal leg 48 of the second frame member 32b in the locking position. Consequently, the arm 40 is firmly pressed downwardly in the locking position during the use of the bed. Thus the danger of the arm 40 accidentally moving out to the disengaging position is substantially eliminated.

It will, of course, be understood that modifications of the present invention, in its various aspects, will be apparent to those skilled in the art, some being apparent only after study and others being matters of routine mechanical design. For example, the number of the apertures 52 formed in the horizontal flange of the first frame member 32a is not limited to three, but it may be more or less than three. Furthermore, although the interlocking joint assemblies 10 and 30 may be located at the central portions of the head and foot cross frame members as shown in FIG. 1, it should be appreciated that they may be located closer to either one of the side frame members 2 or 3. As such, the scope of the invention is not limited to the particular embodiments herein described but extends to all modifications, embodiments, alternatives and equivalents falling within the scope of the appended claims.

What is claimed is:

1. An interlocking joint assembly for longitudinally joining a first frame member and a second frame member of a bed frame comprising:
   a projection on said first frame member;
   a keyhole slot in said second frame member for receiving said projection; and
   an arm pivotally connected to said second frame member, said arm being vertically pivotable for releasably abutting said projection in said keyhole slot.

2. The interlocking joint assembly of claim 1 wherein said projection comprises a stem projecting from said first frame member, and a head carried by said stem.

3. The interlocking joint assembly of claim 2 wherein said keyhole slot comprises an enlarged opening for passage of said head of said projection and a narrowed longitudinal slot connected to said enlarged opening for receiving said stem.

4. The interlocking joint assembly of claim 3 wherein said arm pivots vertically between a disengaging position wherein said head of the projection may pass through the enlarged opening of the keyhole slot, and a locking position wherein said arm abuts said projection to prevent passage of the head of the projection through the opening of the keyhole slot.

5. The interlocking joint assembly of claim 4 wherein said arm is positioned to be engaged by a bed placed on the frame to prevent vertical pivotal movement of the arm to the disengaging position.

6. The interlocking joint assembly of claim 5 wherein the arm has an ear extending horizontally over said second frame member so that the bed rests on the ear when placed on the frames to prevent vertical pivotal movement of the arm to the disengaging position.

7. The interlocking joint assembly of claim 6 wherein the ear extends over said second frame member with an end portion thereof protruding from one side of said second frame in said locking position.

8. The interlocking joint assembly of claim 4 wherein said arm comprises a generally rectangular plate having a vertical edge which engages said projection in said locking position.

9. An interlocking joint assembly for joining a first angle frame member and a second angle frame member of a bed frame, said angle frame members each having a vertical leg and a horizontal leg, said interlocking joint assembly comprising:
   a plurality of projections disposed on the vertical leg of said first angle frame member, said projections being aligned along the length of said first frame member;
   a plurality of keyhole slots defined by the vertical leg of said second angle frame member for receiving said projections; and
   an arm pivotally connected to the vertical leg of said second angle frame member, said arm being pivotable between a disengaging position wherein said arm does not engage said projections and a locking position wherein said arm engages one of said projections thereby releasably retaining said projections in said keyhole slots;
   said arm having a laterally extending ear which overlies the second angle frame member horizontal leg when the arm is in the locking position.

10. The joint assembly of 9 wherein said projections each comprise a stem projecting from the vertical leg of said first angle frame member and a head larger than said stem spaced approximately the thickness of the vertical leg of said second angle frame member from the vertical leg of said first frame member.

11. An interlocking joint assembly according to claim 10 wherein said keyhole slots each comprises an enlarged opening for passage of said head of said projection and a longitudinal narrowed slot connected to said opening for receiving said stem.

12. A method of assembling a bed including a box spring and a bed frame, said bed frame having a first frame member, a second frame member, at least one projection pin on said first frame member, at least one keyhole slot in said second frame member and engageable with said projection pin, and a locking arm pivotally connected to said second frame member for releasably retaining said first frame member at a fixed position with respect to said second frame member, said method comprising the steps of:
   inserting said projection pin into said keyhole slot to longitudinally connect said first member to said second frame member;
   vertically positioning said locking arm to a locking position wherein said projection pin is retained in said key hole slot; and
   placing said box spring on said connected first frame member and second frame member.

13. A method according to claim 12, wherein said locking arm is pivotable between a locking position and a release position, said arm having an ear positioned to be engaged by the box spring placed on the connected frame members to prevent movement of said arm to the released position.

* * * * *